United States Patent [19]

Haginomori

[11] Patent Number: 4,493,008
[45] Date of Patent: Jan. 8, 1985

[54] GAS-INSULATED SWITCHGEAR

[75] Inventor: Eiichi Haginomori, Tokyo, Japan

[73] Assignee: Tokyo Shibaura Denki Kabushiki Kaisha, Kawasaki, Japan

[21] Appl. No.: 348,273

[22] Filed: Feb. 12, 1982

[30] Foreign Application Priority Data

Feb. 12, 1981 [JP] Japan .................................. 56-19492
Jul. 22, 1981 [JP] Japan ........................ 56-107717[U]

[51] Int. Cl.³ .............................................. H02B 1/04
[52] U.S. Cl. ................................ 361/341; 200/148 B; 361/333; 361/335
[58] Field of Search ............... 361/332, 333, 335, 341, 361/361, 363; 200/50 AA, 148 R, 148 B, 145; 307/17, 42, 83

[56] References Cited

U.S. PATENT DOCUMENTS

| 3,823,346 | 7/1974 | Olsen | 361/341 |
|---|---|---|---|
| 3,824,361 | 7/1974 | Noack et al. | 200/145 |
| 4,032,820 | 6/1977 | Oishi et al. | 361/333 |
| 4,045,634 | 8/1977 | Nakano et al. | 200/148 B |
| 4,209,821 | 6/1980 | Kobayashi et al. | 361/333 |
| 4,237,520 | 12/1980 | Oishi et al. | 361/335 |
| 4,262,323 | 4/1981 | Yoshida | 361/333 |
| 4,297,553 | 10/1981 | Kawaguchi et al. | 200/148 B |
| 4,354,220 | 10/1982 | Oishi et al. | 361/341 |
| 4,383,151 | 5/1983 | Holmgren et al. | 200/148 B |

FOREIGN PATENT DOCUMENTS 0015225 9/1980 European Pat. Off. ............ 361/333

Primary Examiner—A. D. Pellinen
Assistant Examiner—Gregory D. Thompson
Attorney, Agent, or Firm—Oblon, Fisher, Spivak, McClelland & Maier

[57] ABSTRACT

A gas-insulated switch gear composed of a combination of a plurality of gas-insulated equipment, including a plurality of vertically mounted disconnecting switches having outlet sections located at respective upper and lower sides of the switches, main buses and an output bus connected across the lower output sections of the disconnecting switches, and a circuit breaker horizontally mounted beneath the main buses and coupled to the upper output sections of the disconnecting switches.

3 Claims, 14 Drawing Figures

GAS-INSULATED SWITCHGEAR

BACKGROUND OF THE INVENTION

1. Field of the Invention

The present invention relates to an insulated power switch-gear apparatus, and more particularly to an improvement in an insulated power switch-gear apparatus suitable for superhigh voltage power electric substations or power electric switching stations.

2. Description of the Prior Art

Power electric substations or power electric switching stations in or around big cities or seaside areas tend to be constructed in the form of what are called "compact substations or switching stations" in which component electric devices are sealed in an insulating gas or immersed in an insulating oil, for the reasons of difficulty in acquiring land or preventing problems associated with salt.

In order to sharply reduce the area of land, the above-mentioned type of compact substation is so constructed that the required devices are arranged in three dimensions and connected by means of insulated bus bars sealing the insulating fluid such as $SF_6$ gas.

In order to provide a gas-insulated power switch-gear apparatus having an improved capability of withstanding earthquakes, U.S. Pat. No. 4,032,820 discloses a gas-insulated switch-gear wherein the main component devices including the circuit breakers, current transformers, disconnecting switches and feeding bus bars are arranged in at least one straight line in one horizontal plane, while the main bus bars are disposed at substantially right angles to the direction of arrangement of the above-mentioned main component devices in a second plane parallel to the plane in which the main component devices are arranged. The gas-insulated switch-gear as described in U.S. Pat. No. 4,032,820 cannot make it possible to sharply reduce the area of the land in which the gas-insulated switch-gear is provided, because the whole of the insulated switch-gear apparatus built around the circuit breakers is positioned low in height in order to improve the capability of the apparatus to withstand earthquakes.

There have been introduced a number of inventions as regards the construction of gas-insulated switch-gear in the prior art. Therefore there are a diversity of switch-gear constructions, which need many types of disconnecting switches to be used therein. The disconnecting switches, therefore, have the disadvantage that they are difficult to standardize and that the manufacturing cost of the equipment as a whole will be high.

SUMMARY OF THE INVENTION

Accordingly, one object of this invention is to provide a novel gas-insulated switch-gear which enables not only improving of the earthquake-resistance of the apparatus, but also sharp reduction in the area of the land on which the apparatus is built.

Another object of the present invention is to lower the manufacturing cost of the gas-insulated switch-gear by standardizing the principal components of the disconnecting switches.

These and other objects are achieved according to the invention by providing a gas-insulated switch-gear generally constructed vertically wherein comparatively heavy circuit breakers are positioned at the bottom of the switch-gear and current transformers, disconnecting switches, ground switches and the like are built upwardly relative to the circuit breakers in two directions through feeding bus bars. Further, main bus bars are appropriately positioned above the circuit breakers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
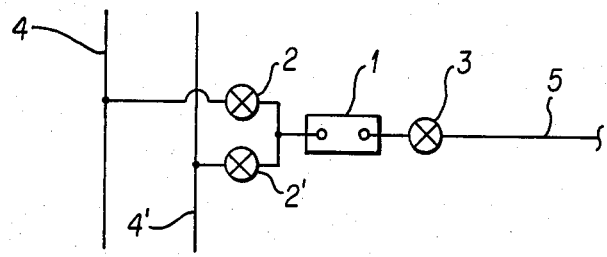
FIG. 1 is a schematic diagram of a double-bus system substation.

Referring now to the drawings, wherein like refernce numerals designate identical or corresponding parts throughout the several views, and more particularly to FIG. 1 thereof, the numeral 1,1' respectively designate a circuit breaker and a rack for supporting the circuit breaker; the numerals 2,2' designate disconnecting switches for a main bus; the numeral 3 designates a disconnecting switch for an outgoing bus; and the numerals 4,4' designate main buses. The numeral 5 designates an outgoing bus.

Figure 2:
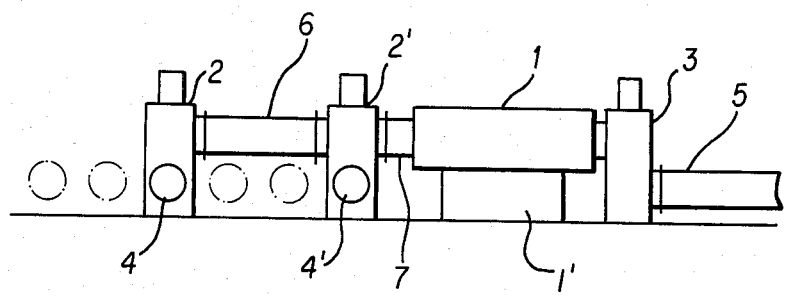
FIG. 2 is a schematic illustration of one example of a gas-insulated switch-gear according to the invention forming a connection shown in FIG. 1.

FIG. 2 is an illustration showing one example of the gas-insulated switch-gear forming the connection shown in FIG. 1.

Either of the disconnecting switches 2,2' for the main buses 4,4' and the disconnecting switch 3 for the outgoing bus 5 (both being disposed on the same plane as the gas circuit breaker 1 of which the breaker section is horizontal), is of vertical longitudinal construction and the lower outlet section is set as high as the main buses 4,4' and the outgoing bus 5. The numeral 6 designates the link bus which connects both disconnecting switches 2,2' and the numeral 7 designates the link bus which connects the gas circuit breaker 1 and the disconnecting switch 2'.

In the meantime, the upper outlet sections of each of the disconnecting switches 2,2' and 3 are raised to the same level as the outlet section of the circuit breaker 1. In this case, some suitable supports are sometimes needed to be inserted under the circuit breaker 1 to adjust the height of the circuit breaker. The supports should be used merely to support the circuit breaker horizontally at a relatively low level and therefore there will not occur any problem as to the manufacture and strength of the supports.

Figure 3:
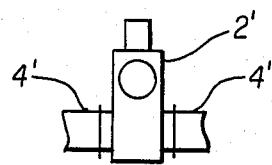
FIG. 3 is a schematic side view of a disconnecting switch 2' for the main bus of FIG. 2.

FIG. 3 is a side view of the disconnecting switch 2' of FIG. 2 in which the main buses 4,4' are connected with the lower outlet section. Namely the length of disconnecting switch 2' serves as a part of the main bus.

Figure 4:
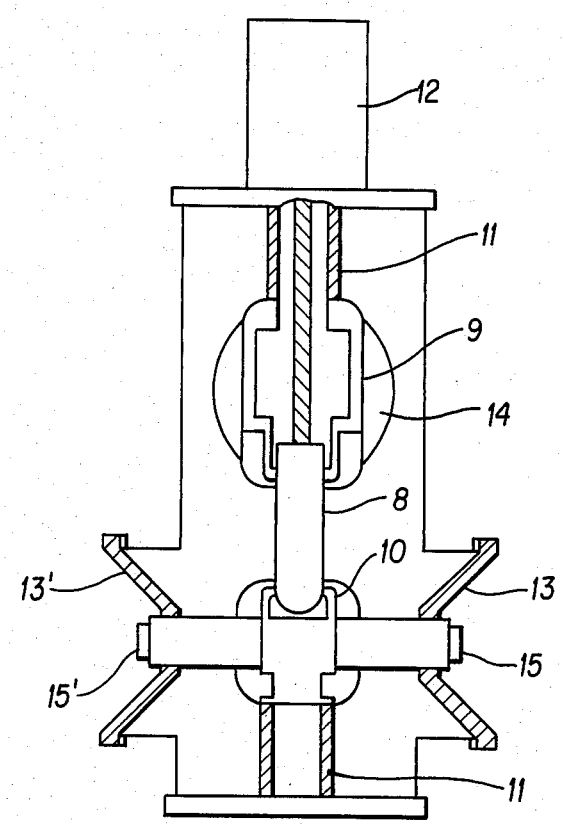
FIG. 4 is a schematic illustration of one example of the internal construction of a disconnecting switch of FIG. 3.

FIG. 4 shows an example of the internal construction of the disconnecting switch in which a moving contact 8 of a moving contact section 9 is separably inserted in a fixed contact section 10 and axially disposed in a cylindrical container through supporting insulating tubes 11. The moving contact 8 is adapted to be operated by a control system (not shown) contained in a control system housing 12. Further, insulating spacers 13,13' are disposed at prescribed positions in the lower section while upper outlet insulating spacer 14 is placed at a prescribed position in the upper section.

In the middle of the insulating spacers 13,13' conductors 15,15' respectively hermetically penetrate. In the same way in the middle of the insulating spacers 14, a conductor (not shown) penetrates hermetically.

By thus designing, the disconnecting switches 2,2' for the main buses and the disconnecting switch 3 for the outgoing bus, excepting their outlet sections, can be made common in their basic construction, thereby standardizing the equipment. Also the circuit breaker 1, the disconnecting switches 2,2' and 3 at respective outlets, main buses 4,4' and outgoing bus 5 can all be installed on the same level foundation so that the equipment can be installed efficiently and moreover be provided with fairly excellent earthquake resistance. Furthermore, the construction of the equipment can be made simple because of simplified direct connection by the buses between equipment. In the construction of the disconnecting switch, in particular as shown in FIG. 4, major internal parts as well as the case are arranged bilaterally symmetrically so that the moving and fixed contact are less subjected to deflection likely to be caused by thermal expansion and pressure deformation and can readily be adapted in large-sized equipment. Further, as is clear from FIG. 3, the length of the main bus can be made short by the size of the shaft end between the outlet sections of the disconnecting switches.

Figure 5:
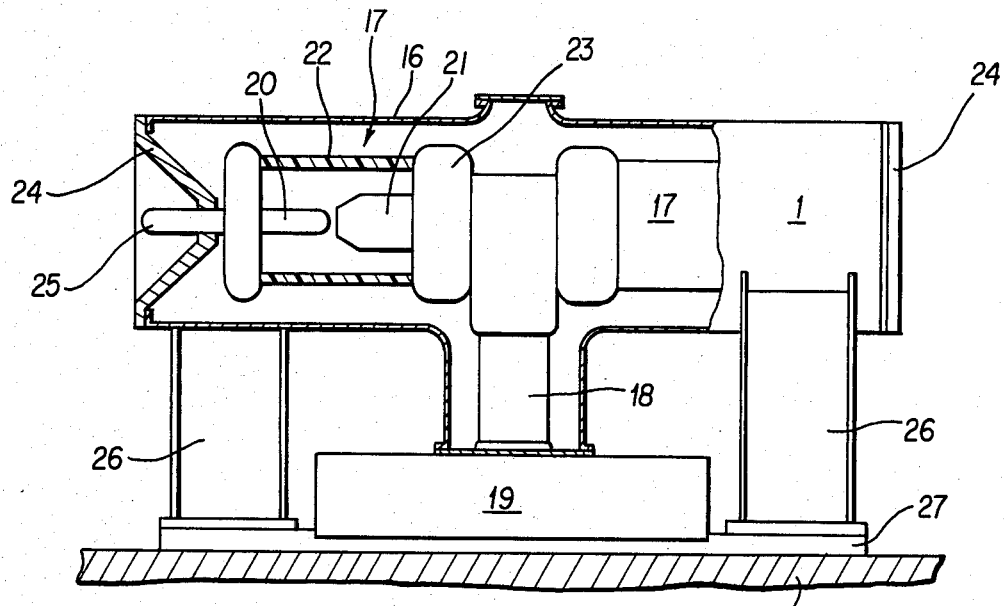
FIG. 5 is a schematic end view partially in cross-section showing the construction of a gas-insulated switch-gear according to the invention.

FIG. 5 specifically illustrates a gas circuit breaker. In the drawings, the gas circuit breaker 1 is mounted on supporting racks 26 and includes a plurality of breaker sections 17 supported by hollow insulating cylinder 18 within the tank 16 filled with SF$_6$ gas. The breaker sections 17 are adapted to be operated by a control system (not shown) contained in the control system housing 19.

Each of the breaker sections 17 includes a fixed contact 20 and a movable contact 21 opposed thereto and the fixed contact 20 is supported to a movable contact section 23 by an insulating cylindrical material 22. The longitudinal ends of the tank 16 are provided with conical insulating spacers 24 for gas confinement. In the middle of the insulating spacers 24, conductor 25 penetrates hermetically. The tank 1 is supported on the foundation 28 through a common base 27.

Figure 6:
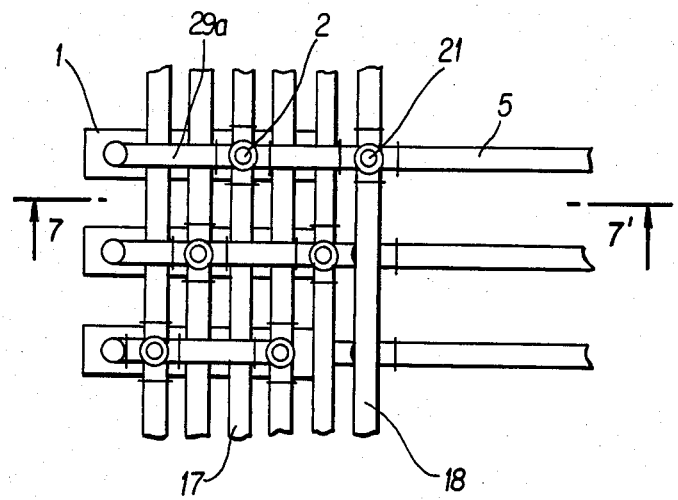
FIG. 6 is a plan view showing one example of the gas-insulated switch-gear according to the present invention.
Figure 7:
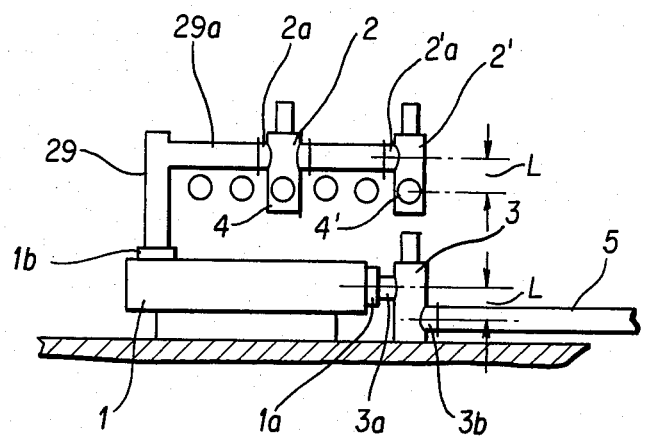
FIG. 7 is a view taken along the line 7—7 of FIG. 6.
Figure 8:
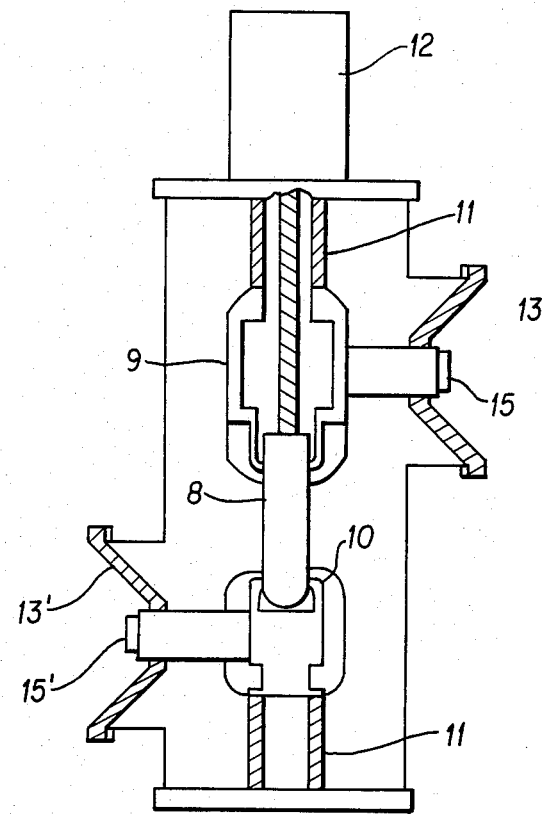
FIG. 8 is a cross-sectional view showing the construction of a disconnecting switch different from that shown in FIG. 4.
Figure 9:
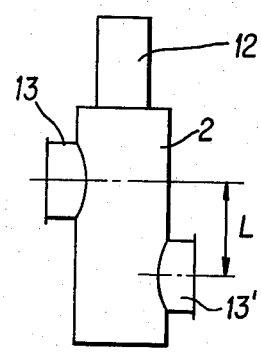
FIG. 9 is a side view showing the disconnecting switch of FIG. 8.
Figures 10A, 10B:
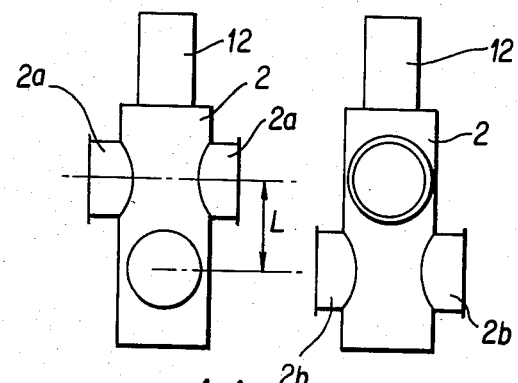
FIGS. 10 (a) and (b) and FIGS. 11 (a) and (b) are front and side views showing bus disconnecting switches, respectively.
Figures 11A, 11B:
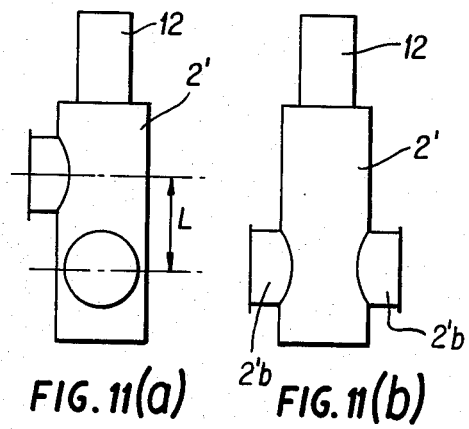
Figure 12:
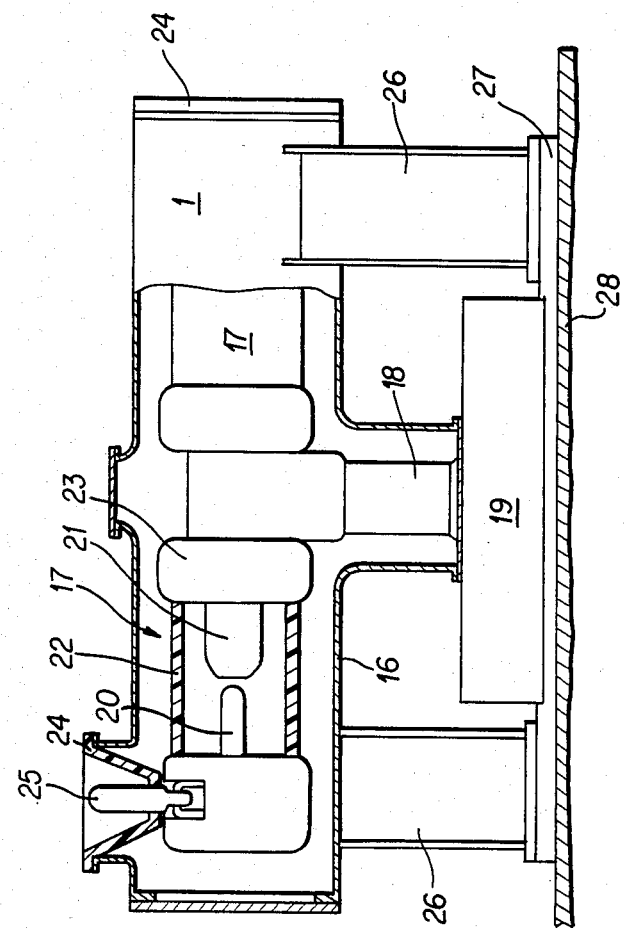
FIG. 12 is a schematic end view, partly in cross-section of a switch-gear of another embodiment of the invention.

The embodiment shown in FIGS. 6 and 7 corresponds to the example of the schematic diagram of FIG. 1. FIGS. 6 and 7 show gas-insulated switch-gears for one three-phase line installed at the main bus of a double-bus system. In the switch-gear of each phase, the upper terminal section 3a of a vertical type line disconnecting switch 3 (see FIG. 3) is connected with a terminal section 1a at one end of each circuit breaker 1 which is disposed horizontally; one end of a horizontally disposed line link bus 5 is connected with lower terminal section 3b, and the other end of this bus 5 is connected with, for example, a bushing connected with an overhead line. The main buses 4,4' of the doublebus system are horizontally disposed at right angles with the direction of installation of a circuit breaker 1 above this circuit breaker 1. Also, the horizontally extended portion 29a of the bus link bus 29 which is connected with the other terminal section 1b of the circuit breaker 1, is horizontally disposed at right angles with the direction of installation of main buses 4,4' above these main buses 4,4', and is inserted at its midpoint, into a couple of terminals 2a installed in opposite positions at the upper part of one bus disconnecting switch 2 (see FIG. 11).

Further, the main bus 4 is inserted in a couple of terminal sections 2b installed below the terminal sections 2a, in opposite positions, at right angles with the terminal sections 2a, the main bus 4 being connected in a horizontal direction. Connected with the end of the horizontally extended portion 29a of the link bus is the upper terminal section 2'a of the other bus disconnecting switch 2', and, below the terminal 2'a, a couple of terminal sections 2'b disposed in opposite directions at right angles with the terminal 2'a are inserted on the way of the main bus 4' each being connected in the horizontal direction. Thus, a difference in the height of the axial lines of the aforesaid circuit breaker 1 and the line link bus 5 and a difference in the height of the extended portion 29a of the bus link bus, main buses 4,4' and their axial lines can be set at the same value L. That is, the vertical distance between the terminal sections 3a and 3b of the line disconnecting switch 3 and the vertical distance between the terminal sections 2a and 2b and 2'a and 2'b of the bus disconnecting switches 2,2' are set at the same size L. If, therefore, there is any difference in the direction of the terminal section of the disconnecting switches 2,2', 3 and in the number of the terminals, most of principal components directly related with the performance of built-in contactors, insulators and driving means can be made common. Thus standardizing the principal components can improve producibility of the equipment and further largely decrease the manufacturing cost.

As described above, the principal components of the disconnecting switches according to the present invention can be standardized and therefore the gas-insulated switch-gear of low manufacturing cost can be provided.

As has been described in detail, the present invention is intended to provide a gas-insulated switch-gear which has excellent earthquake resistance, working efficiency in installation, and economy, and permits the installation of connecting sections of respective equipment at the same level and accordingly directly on a ground foundation and connection of each equipment in a simple manner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas-insulated switch-gear comprising:
   a circuit breaker mounted parallel with respect to a horizontal ground plane and defining an axial line and having two ends;
   a first line disconnecting switch mounted vertically with respect to said ground plane and having upper and lower terminal sections in which the upper terminal section thereof is connected to one end of said circuit breaker;
   a line link bus defining an axial line and coupled to the lower terminal section of said first disconnecting switch;
   a second vertical type line disconnecting switch having upper and lower terminal sections;
   a bus link bus coupling said second disconnecting switch to the other terminal of said circuit breaker, said bus link having a horizontal portion defining an axial line and connected to the upper terminal section of said second disconnecting switch and a vertical portion connected to the other terminal section of said circuit breaker;
   a horizontally disposed main bus located above said circuit breaker and defining a respective axial line, said main bus connected to the lower terminal section of said second disconnecting switch; and
   the axial lines of said circuit breaker and said line linked bus defining a difference in height and the axial lines of said bus link bus and said main bus defining a difference in height which is equal to the difference in height between the axial lines of said circuit breaker and said line link bus.

2. A gas-insulated switch-gear according to claim 1 wherein said circuit breaker comprises:
   a tank having opposed ends at which are provided respective breaker sections making connection to respective outlet sections of said disconnecting switches, each breaker section comprising a fixed contact section and a moving contact section insulated and supported at a respective end of said tank.

3. A gas-insulated switch-gear comprising:
   a circuit breaker mounted parallel with respect to a horizontal ground plane and defining an axial line and having two ends;
   a first line disconnecting switch mounted vertically with respect to said ground polane and having upper and lower terminal sections separated by a vertical distance in which the upper terminal section thereof is connected to one end of said circuit breaker;
   a line link bus defining an axial line and coupled to the lower terminal section of said first disconnecting switch;
   a second vertical type line disconnecting switch having upper and lower terminal sections separated by the same vertical distance as in said first switch;
   a horizontally disposed main bus located over said circuit breaker and perpendicular thereto and defining a respective axial line, said main bus connected to the lower terminal section of said second disconnecting switch;
   a bus link bus extending vertically from one end of said breaker and then extending horizontally and parallel to and over said breaker and also over said main buses, coupling said second disconnecting switch to the other terminal of said second breaker, said bus link bus connected to the upper terminal sction of said second disconnecting switch in the other terminal section of said circuit breaker; and
   the axial lines of said circuit breaker and said line link bus defining a difference in height and the axial lines of said bus link bus and said main bus defining a difference in height which is equal to the difference in height between the axial lines of said circuit breaker and said line link bus;
   whereby said first switch and said second switch are made with similar dimensions so that interchangeable parts may be used.

* * * * *